(12) United States Patent
El-Moursy et al.

(10) Patent No.: US 8,356,304 B2
(45) Date of Patent: Jan. 15, 2013

(54) METHOD AND SYSTEM FOR JOB SCHEDULING

(75) Inventors: Ali El-Moursy, Giza (EG); Hisham El-Shishiny, Cairo (EG)

(73) Assignee: International Business Machines Corporation, Armonk, NY (US)

( * ) Notice: Subject to any disclaimer, the term of this patent is extended or adjusted under 35 U.S.C. 154(b) by 373 days.

(21) Appl. No.: 12/827,834

(22) Filed: Jun. 30, 2010

(65) Prior Publication Data

US 2011/0004883 A1 Jan. 6, 2011

(30) Foreign Application Priority Data

Jun. 30, 2009 (EP) .................................... 09164158

(51) Int. Cl.
*G06F 9/46* (2006.01)
*G06F 11/00* (2006.01)
(52) U.S. Cl. ........ 718/102; 718/103; 718/104; 718/108; 714/49

(58) Field of Classification Search .................. None
See application file for complete search history.

(56) References Cited

U.S. PATENT DOCUMENTS

| 6,658,447 B2* | 12/2003 | Cota-Robles ................. 718/103 |
| 2006/0184946 A1* | 8/2006 | Bishop et al. ................. 718/102 |

* cited by examiner

*Primary Examiner* — Camquy Truong
(74) *Attorney, Agent, or Firm* — DeLizio Gilliam, PLLC

(57) ABSTRACT

Logical processors/hardware contexts are assigned to different jobs/threads in a multithreaded/multicore environment. There are provided a number of different sorting algorithms, from which one is periodically selected on the basis of whether the present algorithm is giving satisfactory results or not. The period is preferably a super-context interval. The different sorting algorithms preferably include a software/OS priority. A second sorting algorithm may include sorting according to hardware performance measurements. The judgement of satisfactory performance is preferably based on the difference between a desired number of time quantum attributed per super-context switch interval to each job/thread and a real number of time quantum attributed per super-context switch interval to each job/thread.

8 Claims, 7 Drawing Sheets

METHOD AND SYSTEM FOR JOB SCHEDULING

BACKGROUND

1. Technical Field

The present invention relates to the scheduling Jobs in a multitask operating system.

2. Description of Related Art

In the last decade microarchitecture design innovations such as speculation and out-of-order superscalar execution dramatically improved microprocessor efficiency and accordingly performance gains. One such innovation is the Multi-core/multi-threaded on a chip which allows multiple cores to be integrated on a single chip with different levels of sharing chip resources such as memory sub-system known as chip cache memories. In multi-core/multi-thread processors, an Operating system is used to schedule multiple jobs/threads to run concurrently on the underlying platform of multiple logical processors, each on a logical processor. In order to efficiently share the machine resources (specifically the cache system among multiple jobs/threads) an OS job scheduler should be optimized.

Jobs/threads may share machine resources either constructively or destructively based on many factors. Choosing the best set of jobs to share chip resources is a vital step to machine performance and hardware resource utilization. A naive job scheduling will result in inefficient resource allocation, poorly utilized machine resources, and as a result, suboptimal machine throughput. The dominant factor in all of the job scheduling proposed is to schedule the best candidate applications for using the underlying hardware. The measure of success for a job scheduling should not only take into account the machine throughput but also should avoid job starvation. In reality, applications running concurrently are not equally important. Some applications may require hard deadlines to finish their tasks such as real time applications. OS designers have given the users many levels of priorities for their applications to define the importance of the running jobs. In single thread processors achieving the job/thread priorities is very simple and is achievable by simple time quantum sharing of the microprocessor. On the other hand achieving the same goal in multi-core/multi-threaded machines is not that trivial, given the significant level of sharing of the machine resources. One other solution to this problem is the one taken in Patent Application EP08172360.3 (Applicant's reference FR920080216), in which a comparable approach to the one invented here is taken but with different conditions and at a finer granularity level. In Patent Application EP08172360.3 (Applicant's reference FR920080216) sharing of the Fetch bandwidth of SMT processors is controlled using a thread selection and scheduling method. However, in Patent Application EP08172360.3 (Applicant's reference FR920080216) the assumption is that only a limited number of jobs/threads, running on the computer system, exist. This number should be less than or equal to the number of logical processors (hardware contexts) the processor could run/execute simultaneously. Modern OS kernels are built with time sharing capabilities to facilitate scheduling more jobs to run on the system than the hardware contexts. The OS kernel is in charge of taking the decision to context switch jobs/threads to share the hardware resources among so many jobs/threads running on the system. That means control fetch bandwidth utilization may not always be enough to control sharing of the machine resources, since the OS decisions to schedule jobs/threads concurrently to run on the system will directly affect machine throughput (given the high level of resource sharing in Multi-core/multi-threaded processors). Accordingly, OS job scheduling should use both machine performance/throughput measurements as well as software priority during its scheduling process.

In the article entitled Symbiotic Job scheduling with Priorities for a Simultaneous Multithreading Processor. Sigmetrics 2002 by Allan Snavely, Dean M. Tullsen, and Geoff Voelker [Allan], SMT processors could run in either single threaded or multithreaded (SMT) mode. The time quantum for each application, defined by its priority, is divided into two parts: one for the application to run with others in SMT mode and the second for the application to run alone to achieve its time quantum. There are at least two drawbacks for using this method. First, running an application in a single thread mode on an SMT machine for a full context switch period may result in a significant waste of the SMT machine resources that could be utilized by other threads/applications. A more fine grained mechanism is required to achieve both machine-efficient utilization as well as application priority. Second, the mechanism described to reduce the waste in machine resources relies on SOS (Sample, Optimize, Symbios) job scheduling which has scaling limitations.

Another solution to the thread priority problem in SMT processors is presented in U.S. Pat. No. 6,658,447. In the referenced disclosure, thread hardware execution heuristics are scaled based on each application OS priority. The success of the technique is highly dependent on the success in finding the appropriate scaling function as well as the simplicity of that function to be implemented in hardware to get cycle by cycle feedback information which is not guaranteed. Another drawback is that scaling may completely invert the hardware priority in favour of OS priority or vice versa. It could be argued that the dynamic change of the scaling functions could compensate for that effect but this will make it even harder to implement and run on a cycle by cycle basis. Also there is no guarantee that the high priority threads will actually achieve their assigned time quanta for hard deadline applications. In US2006/0184946 a method is implemented to strictly achieve the OS thread priority for two threads on a cycle by cycle basis without any consideration to the SMT machine performance or throughput.

SUMMARY

According to one embodiment of the present invention a method is provided of scheduling logical processor contexts to a number (P) of different jobs in a multithreaded/multicore environment wherein a first predetermined number (N) of logical processor contexts may be carried out in a given context switch interval. In the described method, a software/OS priority for each job is determined; super-context switch intervals of equal length are defined, each divided into a predetermined number of context switch intervals of equal length; a desired number of concurrent scheduling time quanta are attributed to each said job on the basis of software/OS priority (Desired_Time_Quantum) and each super-context switch interval; each of the first predetermined number (N) of logical processor contexts for each context switch interval are attributed to a respective one of the jobs on the basis of either a first sorting algorithm or a second sorting algorithm; an error value is determined based on the difference between the desired number of concurrent scheduling time quanta per super-context switch interval and the number of concurrent scheduling time quanta attributed per super-context switch interval to each job. In the described method embodiment, the first sorting algorithm comprises sorting jobs according to their software/OS priorities, and wherein the first sorting algorithm is a default mode of operation. When the error value exceeds a predetermined value, the described method switches to whichever of the two sorting algorithms is not presently selected for following super-context switch intervals.

Further advantages of the present invention will become clear to the skilled person upon examination of the drawings and detailed description. It is intended that any additional advantages be incorporated herein.

BRIEF DESCRIPTION OF THE DRAWINGS

Embodiments of the present invention will now be described by way of example with reference to the accompanying drawings in which like references denote similar elements, and in which.

DETAILED DESCRIPTION

Figure 1:
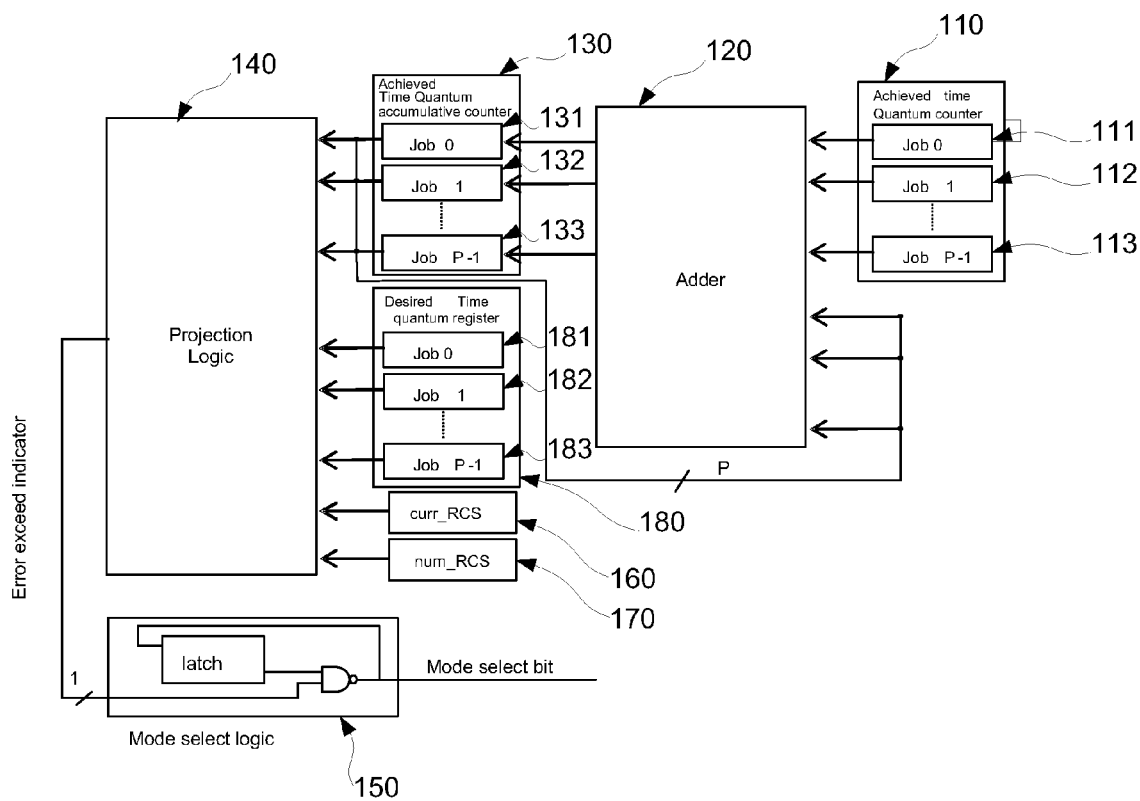
FIG. 1 shows schematically certain functional elements used to implement the projection and processor mode switching according to an embodiment of the present invention.

According to one embodiment of the present invention there is provided a method of scheduling logical processor contexts to (P) different jobs in a multithreaded/multicore environment wherein a first predetermined number (N) of logical processor contexts may be carried out in a given context switch interval. The method comprises determining a software/OS priority for each job and defining super-context switch intervals of equal length, each divided into a predetermined number of context switch intervals of equal length. The expression "Context Switch Interval" is a well known term in the relevant art, representing a period during which a group of applications or threads are scheduled to run on the computer processors, for example by the Operating System. The "super-Context Switch Interval" as described in more detail hereafter represents a predetermined number of Context Switch Intervals. A desired number of concurrent scheduling time quanta are attributed to each job on the basis of the software/OS priority (Desired_Global_Time_Quantum). Each super-context switch interval, each of the first predetermined number (N) of logical processor contexts for each context switch interval are attributed to a respective one of the jobs on the basis of either a first sorting algorithm or a second sorting algorithm, wherein the first sorting algorithm comprises sorting the jobs according to their software/OS priorities, and wherein the first sorting algorithm is a default mode of operation. Furthermore, each super-context switch interval an error value is determined based on the difference between the desired number of concurrent scheduling time quanta per super-context switch interval and the number of concurrent scheduling time quanta attributed per super-context switch interval to each job. In a case where the error value exceeds a predetermined value, a switch is made to whichever of the two sorting algorithms is not presently selected for following super-context switch intervals.

Advantages of one or more embodiments of the present invention include but are not limited to: facilitated dealing with a large number of jobs running concurrently on the system; ease of implementation using Kernel Software capabilities; greater flexibility of design to adjust/tune at a software level; a coarse granularity level of implementation which provides reduced cost and allows for full flexibility in using the system hardware with improved performance; and potentially an improved ability to satisfy software/OS priority needs.

Projection & Mode Selection

To facilitate a better understanding of the detailed description of certain embodiments, there follow definitions of certain expressions used to define characteristics of the operating environment of the described embodiments of the present invention.

An N-Way Multi-core/multi-threaded processor is a processor that can run (N) jobs/threads on N Hardware contexts or logical processors simultaneously, accordingly an OS could schedule N jobs on that processor for a given context switch interval/Time Quanta.

Job software/OS priority is directly mapped to a number of Time Quanta during which the job should be scheduled to run on one of the hardware contexts (logical processors).

The Software/OS priority is satisfied if each job consumes exactly the number of Time Quanta assigned to it according to its priority level.

CS_intrv is defined as the number of cycles in a context switch interval.

During each context switch interval, the OS selects N running jobs/threads to be scheduled to run on the processor. If there are fewer than N running jobs/threads the OS will schedule all running jobs/threads to run on the processor. If there are more than N running jobs/threads the OS will select a sub-set N of jobs/threads to schedule them for running on the processor.

An appropriate number of Context switch intervals is aggregated to what is referred to herein as a super-context switch interval (RCS_intrv). RCS_intrv is defined as the number of cycles in a super-context switch interval, being the period over which statistics are collected to determine how close a particular job's progress is to the defined goal (OS Job priority).

N_RCS: is the number of super-context switch intervals during the entire lifetime of the longest job. The lifetime of the longest job is estimated. Accuracy of its estimation doesn't affect the projection accuracy and it is only used to simplify the calculation since the projection mechanism uses a relative approach and doesn't rely on the absolute numbers.

According to an embodiment of the present invention, two modes of processor operation are defined. One is referred to as hardware/throughput mode (perf_mode) and the other is referred to as Software/OS mode (os_mode). For any given RCS_intrv the processor will be solely in one mode, which will not change until that RCS_intrv is completed. The processor mode may be switched from one mode to the other depending on the output of the projection logic as described below.

FIG. 1 shows hardware that may be used to implement a projection portion of one embodiment and to switch between two processor modes. The hardware of the illustrated embodiment of FIG. 1 includes an Achieved Time Quantum counter 110, an Achieved Time Quantum Accumulative counter 130, an Desired Time Quantum register 180, Curr_RCS 160, Num_RCS 170, Projection Logic 140, and Mode select logic 150.

Achieved Time Quantum counter 110 of the depicted environment of FIG. 1 comprises a counter per job that counts the number of time quantum for which each job is scheduled to run on the underlying processor/s during a given RCS_intrv. As shown Achieved Time Quantum counter 110 comprises a counter for each respective Job 0 to N−1, 111, 112 and 113.

Achieved Time Quantum Accumulative counter 130 of FIG. 1 comprises a counter per job that accumulatively counts the number of time quanta scheduled to run on the underlying processor for each job during the Lifetime of the job. As shown, Achieved Time Quantum Accumulative counter 130 comprises a counter for each respective Job 0 to N−1, 131, 132 and 133.

Desired Time Quantum register 180 as shown in FIG. 1 comprises a register per job that is initialized with the Desired Time Quantum as explained below. As shown, Desired Time Quantum register 180 comprises a counter for each respective Job 0 to N−1, 181, 182 and 183.

Curr_RCS 160 of the illustrated embodiment comprises a counter for the number of RCS_intrv since the beginning of the last job launched (started) on the machine. Num_RCS 170 comprises a register which carries the value N_RCS.

In the embodiment depicted in FIG. 1, Projection Logic 140 comprises logic adapted to perform the mathematical formula given by Equation 1 to calculate difference between current_error and error_limit at the end of each RCS_intrv j where j is the value of the Curr_RCS counter which is the number of RCS_intrv passed since the start of the last job launched (started) on the machine.

In the described embodiment, i is an index for the job id for jobs currently scheduled to run on the processor (jobs in an active state) by OS so 0=i<P where P is the total number of active jobs running on the machine. Similarly, Current_error$_j$: is defined to be the normalized error computed as the Manhattan distance between the desired Time Quantum and the projected Time Quantum as shown in Equation 1, and Error_limit is a predefined threshold for the error (i.e. 0.05). The output of projection logic 140 is a one bit indicator that indicates whether current_error exceeds error_limit or not. This indicator is provided to mode select logic 150 as shown and used to identify the mode for the next RCS_intrv.

Within an embodiment of the present invention Desired Time Quantum, is the value of Desired Time Quantum register for job i. Desired Time Quantum, represents the number of Time Quanta for each job to be achieved during the whole lifetime of the job. The value of the Desired Time Quantum is defined according to a mapping between the job Software/OS priority and number of Time Quanta. This mapping could be implemented using simple linear formula such as the one shown in Equation 2 or using a lookup table to map each priority level to a predefined number of Time Quanta. One example of a linear formula to calculate F(Priority$_i$) is shown in Equation 3.

In Equation 2, Num_JS represents the total number of job scheduling opportunities during the entire lifetime of the longest job, and Priority, represents the priority level of job i. Priority levels could take values from zero to a predefined integer constant (i.e. 7). The higher the priority value the higher the priority level. In Equation 4 below, Projected Time Quantum$_{ij}$: is the projected number of Time Quantum for job/thread i for RCS_intrv j at the end of the lifetime of the longest job and is computed as shown. Similarly in Equation 4, Achieved Time Quantum Accumulative$_{ij}$: is defined as the value of the Achieved Time Quantum Accumulative counter for job i at the RCS_intrv j. To increase projection accuracy, projection logic is not effectively operated for number of RCS intervals (j>L, where L is a number of warm up RCS intervals).

$$\text{current\_error}_j = \frac{\sum_{i=0}^{N-1} |\text{Desired\_Time\_Quantum}_i - \text{Projected\_Time\_Quantum}_{ij}|}{\sum_{i=0}^{N-1} \text{Desired\_Time\_Quantum}_i} \quad \text{Equation 1}$$

$$\text{Desired\_Time\_Quantum}_i = \frac{\text{Num\_JS} * F(\text{Priority}_i)}{\sum_{i=0}^{N-1} F(\text{Priority}_i)} \quad \text{Equation 2}$$

$$F(\text{Priority}_i) = 2^{\text{priority}_i} \quad \text{Equation 3}$$

$$\text{Projected\_Time\_Quantum}_{ij} = \left( \frac{\text{Achieved\_Time\_Quantum\_Accumulative}_{ij} * \text{N\_RCS}}{j} \right) \quad \text{Equation 4}$$

As described above, each super-context switch interval comprises a plurality of context switch intervals. Each context switch interval in turn comprises a predefined number of Logical Process Contexts, which is preferably the same for each context switch interval, each Context being attributed to one of N Jobs selected as described herein.

Figure 2:
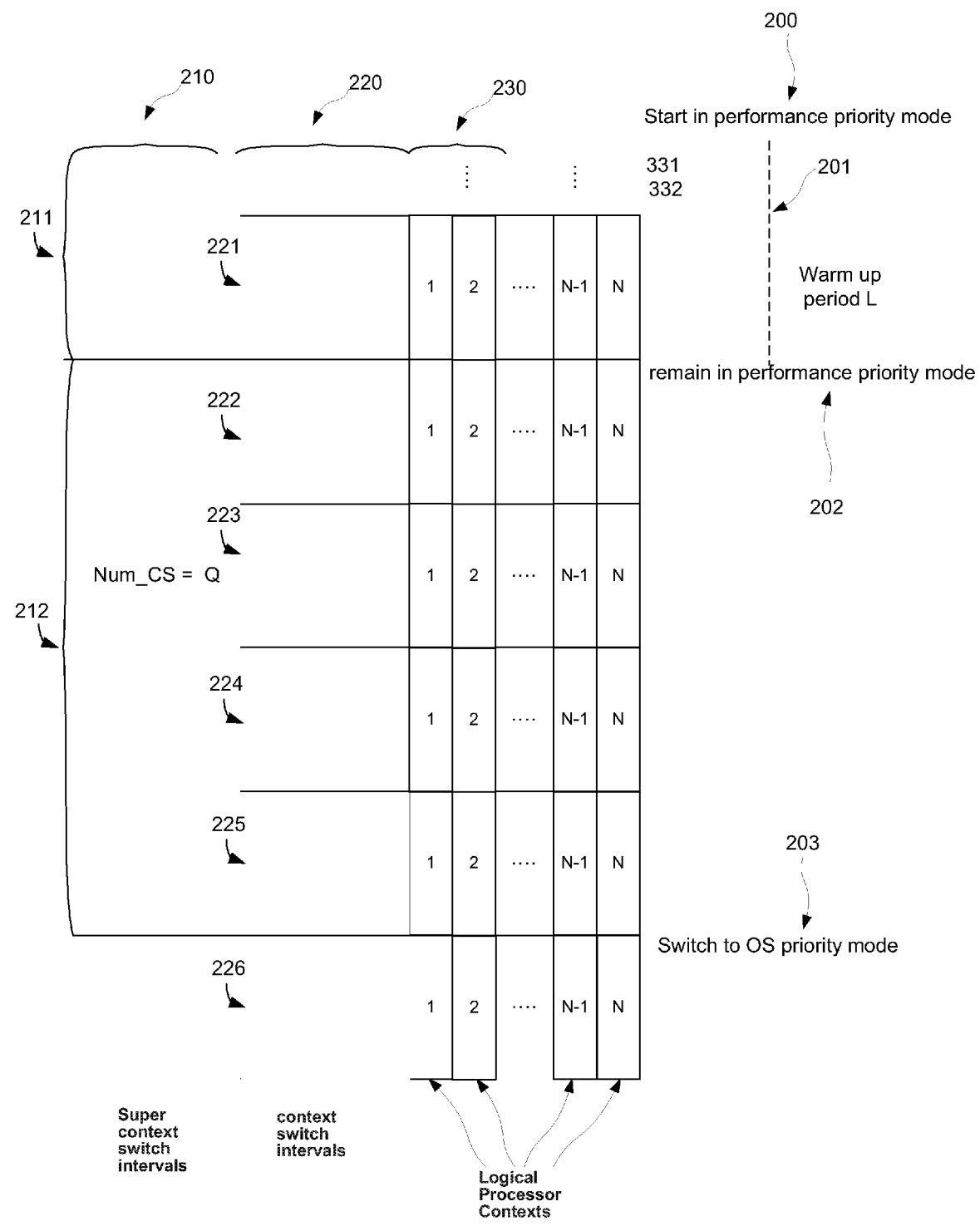
FIG. 2 schematically illustrates the relationship of job lifetime, super-context switch intervals, context switch intervals and jobs according to an embodiment of the present invention.

FIG. 2 schematically illustrates the relationship of job lifetime, super-context switch intervals, context switch intervals and jobs. As shown in FIG. 2, a plurality of sequential super-context switch intervals 210, specifically 211 and 212 are each divided into a plurality of context switch intervals. As shown in the illustrated embodiment, each super-context switch interval comprises four context switch intervals 220, such as 222, 223, 224, 225 in the case of super-context switch interval 212. As depicted, each context switch interval comprises N Logical Processor Contexts, which are shown as being carried out in parallel. Each Logical Processor Context is being attributed to one of the P Jobs presently under execution.

Thus for example, Num_JS, the total number of job scheduling opportunities during the entire lifetime of the longest job, could be determined as N*RCS_intrv where N=6 Logical processor Contexts per Context switch interval and RCS_intrv=4 Context switch intervals such that Num_JS=4×6=24 Logical processor contexts, where there are a total of P jobs running, of which N are selected each Context switch interval.

As described hereafter, each of said N logical processor contexts are attributed to one of the jobs on the basis of a either a first sorting algorithm or a second sorting algorithm, wherein the first sorting algorithm comprises sorting jobs according their software/OS priorities, and wherein the first sorting algorithm is a default mode of operation. Each super-context switch interval, the average number of Logical Processor Contexts attributed per context switch interval to each job is calculated, and from this value a difference between a desired number of Logical Processor Contexts per context switch interval and the average number of Logical Processor Contexts attributed per context switch interval to each job can be determined. By combining the different values for all jobs, an error value is arrived at and in a case where the error value exceeds a predetermined value the sorting algorithm not presently in use is selected for the following context switch interval. As shown in FIG. 2, a warm up period L, 201, expires at the end of super-context switch interval 211, during which period no change in sorting algorithm may take place, the sorting algorithm being fixed to the default "performance priority mode" as described herein. Nevertheless, the Error Value is calculated during the warm up period L, and at the end of the period after context switch 221, the first determination whether the error value exceeds a predetermined value is made. As shown, if it is determined that the error value does not exceed the predetermined value, as shown at 202 the performance priority mode is retained. Execution continues for a further super-context switch interval 212. The Error Value is calculated and at the end of the super-context switch interval 212, a second determination whether the error value exceeds a predetermined value is made. As shown, this time it is determined that the error value exceeds the predetermined value, and accordingly as shown at 203 the sorting algorithm is switched to an alternative sorting algorithm. According to the present embodiment this alternative sorting algorithm is an OS priority mode as described herein.

This process described above is repeated continually, with the sorting algorithm being switched between the OS priority mode and performance priority mode whenever it is determined that the current sorting algorithm is resulting in a divergence from an acceptable error level. At the end of context switch interval 225 of super-context switch interval 212, the Num_RCSth logical processor context is executed before starting a new super context switch interval with a new set of Num_RCS logical processor contexts.

Figure 3:
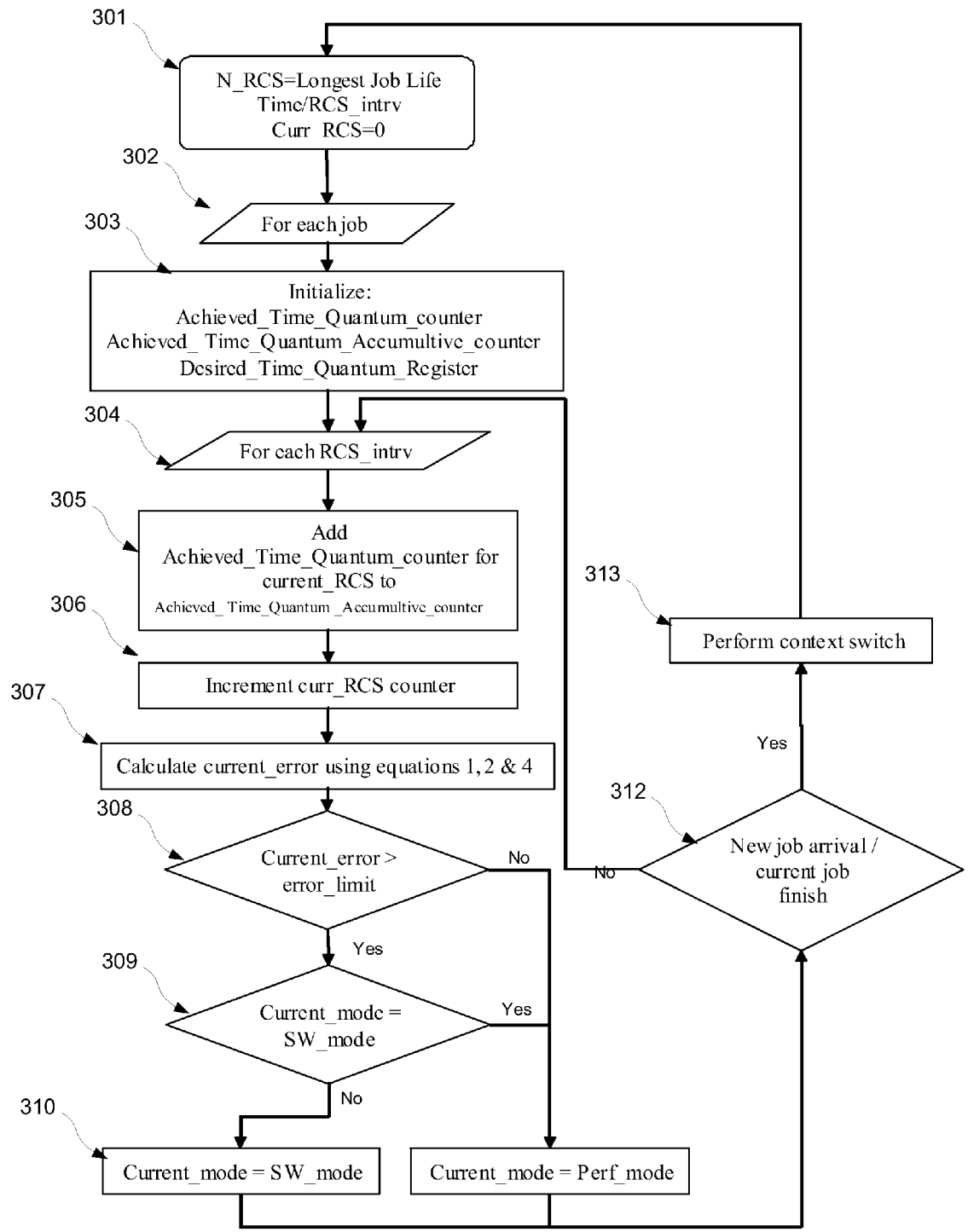
FIG. 3 shows a flowchart that describes the projection process according to an embodiment of the present invention.

FIG. 3 shows a flowchart that describes the projection process according to one embodiment. This embodiment provides a method of scheduling logical processor contexts to (P) different jobs in a multithreaded/multicore environment wherein a first predetermined number (N) of logical processor contexts may be carried out in a given context switch interval.

Prior to initiation of the process, a software/OS priority is determined for each job, and a desired number of concurrent scheduling time quanta is attributed to each job on the basis of this software/OS priority (Desired_Time_Quantum).

At the start of the process, the OS selects N jobs from the P actively running jobs in the system for scheduling to run on the processor (where N is the total number of contexts the processor supports as described above) (process block 301). Thus each of the first predetermined number (N) of logical processor contexts for each context switch interval is attributed to a respective one of the jobs on the basis of either a first sorting algorithm or a second sorting algorithm, wherein the first sorting algorithm comprises sorting jobs according their software/OS priorities, and wherein the first sorting algorithm is a default mode of operation. According to the present embodiment, the first sorting algorithm is always applied for the first iteration.

As an initial operation of the process embodiment illustrated by FIG. 3, super-context switch counter current_RCS is reset. The Super Context switch interval comprises a series of context switch intervals. A sequence of Super-Context switch intervals represents the lifetime of a job, and Num_RCS is estimated as the length of the longest job currently running in the system (this estimate has no direct effect on the algorithm but is used only to ease calculations). There are thus defined a number of super-context switch intervals of equal length, each divided into a predetermined number of context switch intervals of equal length. In the first RCS interval a processor mode is set to performance mode (Perf_mode), that is, a mechanism for selecting jobs based on sorting jobs according to hardware performance counters as described hereafter.

For each job (process block 302) the Desired Time Quantum is calculated (process block 305), the calculated value is stored in a corresponding register, and the Achieved Time Quantum counters reset.

During each super-context switch interval (RCS_intrv) (process block 304) the achieved Time Quantum counter per job per Context switch interval is updated (process block 305).

At the end of super-context switch interval (RCS_intrv) (process block 306) the achieved Time Quantum counter is accumulatively added to the achieved Time accumulative counter and Curr_RCS counter is incremented.

Thereafter, the current error is calculated and compared to the error_limit (preferably after a warm-up period expires) (process block 307). According to one embodiment, projection logic for example as describe above is used to perform the described calculation. In one embodiment of the present invention, the current error is not calculated until the current_RCS exceeds a warm-up value (L) as described before (Not shown). If the error is determined to be greater than the defined limit (process block 308) and if the present selection mode is determined to be SW_mode (process block 309) then the method switches to Perf_mode. Otherwise, if the current mode is determined to be Perf_mode, the current mode is switched or toggled from SW_mode to Perf_mode (process block 310).

In the illustrated embodiment an error value is determined based on the difference between a desired number of concurrent scheduling time quanta per super-context switch interval and the number of concurrent scheduling time quanta attributed per super-context switch interval to each job. If the error is determined to be within the predetermined limit the method proceeds directly to select Perf_mode for the next RCS_int, so that according to this embodiment Perf_mode can be considered to be the default mode. Thereafter the illustrated method embodiment proceeds at which point it is determined whether one of the running jobs has left the system or a new job has been launched (process block 312), in which case a context switch is performed (process block 313) before restarting the depicted process flow (process block 301). Otherwise the depicted method returns to the next super-context switch interval (process block 304). Thus, in a case where the error value exceeds a predetermined value, the method shown in the FIG. 3 switches to whichever of the two sorting algorithms is not presently selected for a subsequent super-context switch interval.

As mentioned above, the length of the super context interval is preferably equal to the estimated duration of the longest job, although this period may be selected on any other basis that would ensure a sufficiently long period for the compilation of statistical information.

According to one embodiment, the operations which together implement the determination of an error value comprise determining an average number of concurrent scheduling time quanta attributed per super-context switch interval to each job, determining for each job a difference between the desired number of concurrent scheduling time quantum per super-context switch interval and the average number of concurrent scheduling time quantum attributed per super-context switch interval to each job, and combining the difference values for all jobs to arrive at an error value.

According to another embodiment, calculating the current error and comparing it to the error_limit is only implemented after a warm-up period expires, such that the current error is not calculated until current_RCS exceeds a warm-up value (L). Thus, there is defined a warm up period during which the selected sorting algorithm remains as the first sorting algorithm regardless of the error value.

Job Selection & Scheduling

According to one embodiment, based on the number of logical processors in the system only a subset (N) of the jobs can run in any given context switch interval (for hardware limitation where N is 0<N<P) where P is the total number of jobs in the active state. N selected jobs from the P jobs are dynamically changed on a Time Quantum basis known as a context switch interval.

Figure 4:
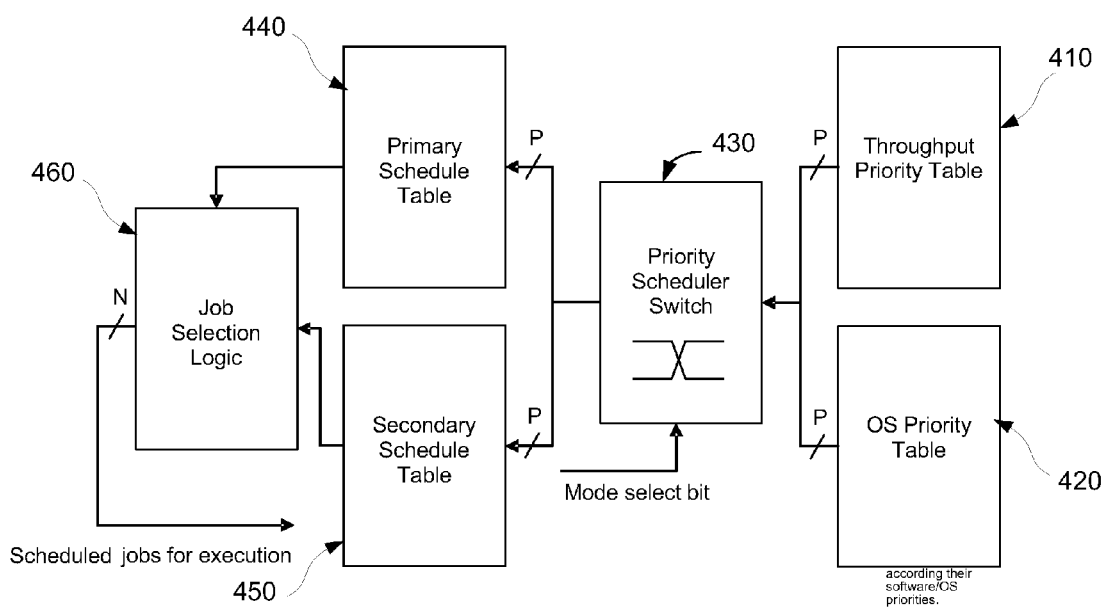
FIG. 4 shows the hardware used to perform the thread selection & scheduling process according to one or more embodiments of the present invention.

FIG. 4 shows hardware used to perform a job selection & scheduling process according to an embodiment of the present invention. In FIG. 4, N jobs are selected to run on the logical processors (CPUs) using job selection logic 460. Job selection logic 460 uses the input from two scheduling tables 440 and 450, 440 being the primary scheduling table and 450 being the secondary scheduling table. In each of the two scheduling tables the P jobs are sorted differently according to one set of priority criteria.

In the described embodiment, two priority criteria are defined: a First criterion or sorting algorithm is software/OS priority (os_prio) in which jobs are sorted according their software/OS priorities. A second sorting algorithm comprises is hardware/throughput priority (perf_prio) according to which jobs are sorted according to their efficiency of utilizing hardware resources.

Respective tables 410, 420 are used to prioritize jobs for each priority criterion. These tables also include information about stalled jobs (active but not running). Stalled jobs are prevented from running in the given context switch interval/s until the stall is released. Each priority table includes a list of job ids sorted according to job priority. Job order in the list indicates job priority such that the higher the jobs in the list order the, higher the job priority.

The population of the hardware/throughput priority table 410 is performed using hardware performance counters the specifics of which are beyond the scope of this disclosure. Population of the software/OS priority table 420 is performed in the described embodiment using Job sort logic. Achieved Time Quantum Accumulative counters are used to populate the software/OS priority table.

Selection of which priority table should populate which scheduling table is done using priority scheduler switch 430 based on the mode selected in the projection as described above.

Job selection logic could be implemented in one or more of at least two ways including, Hierarchical Priority: Selecting the highest priority "N" jobs/threads from the primary table and using the secondary table only in case of a priority tie (two jobs/threads have the same priority levels in the primary table); Stall Priority: Primary schedule table is used solely to filter jobs/threads that are not currently stalled and pass them to the secondary table to prioritize.

Figure 5:
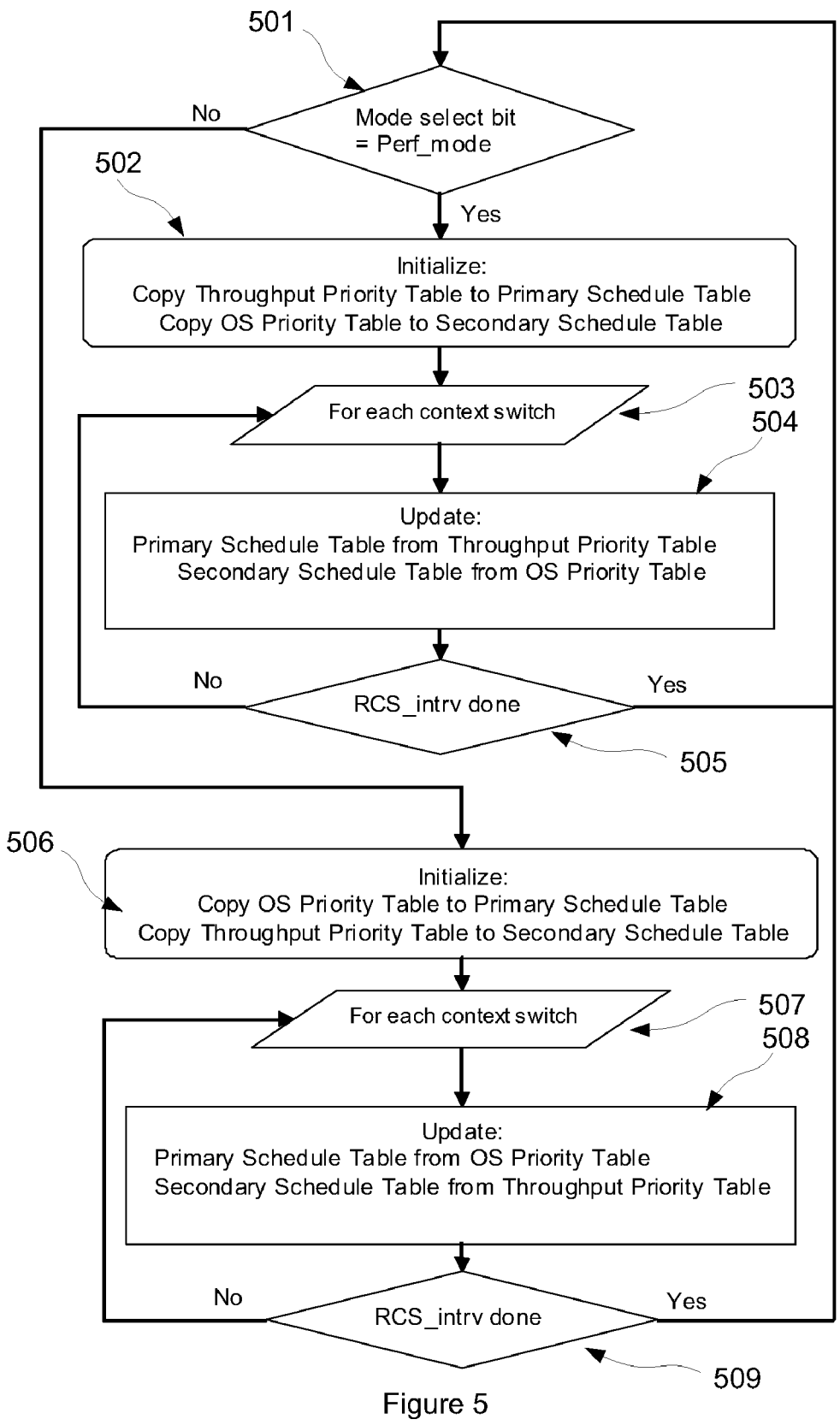
FIG. 5 shows a priority scheduler switch flowchart according to an embodiment of the present invention.

FIG. 5 shows a priority scheduler switch flowchart. As mentioned with regard to FIG. 2 initially the mode select is in Perf_mode. Accordingly, the Primary Schedule table 440 is loaded with the Throughput Priority table 410 contents and the Secondary Schedule table 450 is loaded from OS Priority table 420. Since the mode select can only change every RCS_intrv, the same route will be used to update both schedule tables until mode select is updated using the projection logic described above at the end of every RCS_intrv. At each context switch, Priority Tables 410, 420 are updated based on per job counter (not shown) and accordingly Schedule Tables 440, 450 are updated.

As shown in FIG. 5 a method is illustrated which begins with a determination of whether the present selection algorithm is the throughput priority mode (process block 501). If it is, the method proceeds at which point the contents of throughput priority table 410 are copied to primary schedule table 440 and the contents of OS priority table 420 are copied to secondary schedule table 450 (process block 502). Thereafter, for each context switch period of the present super-context interval (process block 503), primary schedule table 440 is updated from throughput priority table 410 and secondary schedule table 450 is updated from OS priority table 420 (process block 504) respectively. Subsequently it is determined whether the end of the present super-context interval has been reached (process block 505). If the end of the present super-context interval has been reached the illustrated method loops back to restart (process block 501), and if not loops back for the next context switch interval (process block 503).

If it is determined that the present selection algorithm is not the throughput priority mode, the method embodiment of FIG. 5 proceeds at which point the contents of OS priority table 420 are copied to primary schedule table 440 and the contents of throughput priority table 410 are copied to secondary schedule table 450 (process block 506). For each context switch interval in the present super-context interval (process block 507), primary schedule table 440 is updated from throughput priority table 410 and secondary schedule table 450 is updated from OS priority table 420 (process block 508). It is then determined whether the end of the present super-context interval has been reached (process block 509). If the end of the present super-context interval has been reached the method loops back to restart (process block 501), and if not the method loops back for the next context switch interval in the super-context interval (process block 507).

Figure 6:
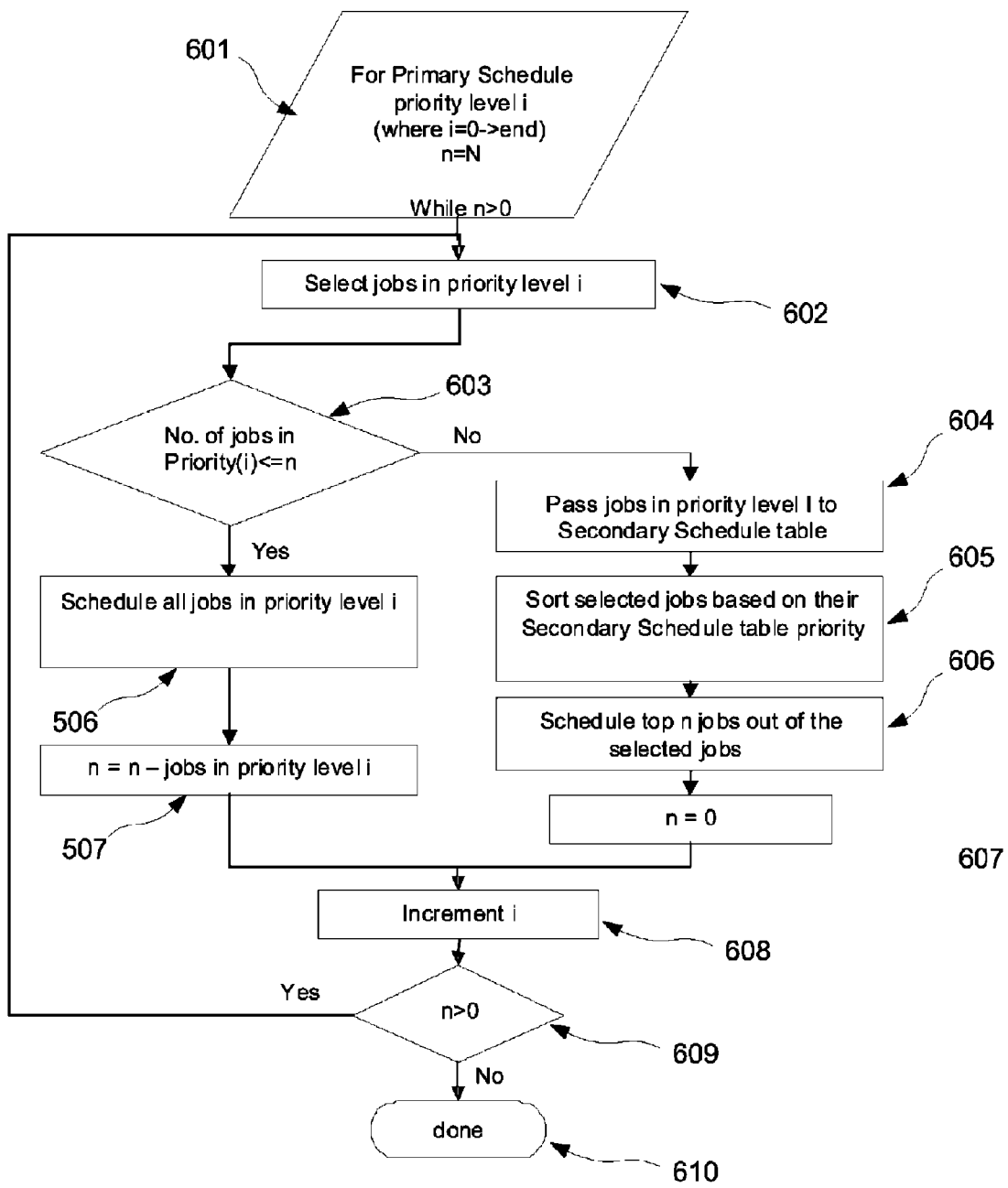
FIG. 6 shows a flowchart for a hierarchical priority method according to an embodiment of the present invention.

As mentioned above, the job selection logic may implement different methods. FIG. 6 shows a flowchart representation of hierarchical priority method according to one embodiment of the present invention. In this method, a Primary Schedule Table is examined ascending from the highest priority to the lowest priority to fill in the logical processor N slots. If jobs in a job priority level exceed N a Secondary Schedule Table is used to sort them according to their secondary priorities. Thus according to this embodiment, in a case where whichever selecting algorithm is used in a given super-context switch interval; given equal priority to two jobs, the other selecting algorithm is used as a tie breaker.

Specifically, in the embodiment of FIG. 6, the depicted method begins at which point an initial priority level i value of o is set, and a value n, which reflects the number of logical processor contexts remaining to be executed in the present super context interval, is initialised at a value equal to N, the number of Jobs under execution (process block 501). The method at which point all Jobs in OS priority table 420 having a priority level equal to i are selected (process block 602). Thereafter it is determined whether the number of jobs selected exceeds the present value of n, the number of logical processor contexts remaining to be executed in the present context interval (process block 603). If the number of selected jobs is less than the number of logical processor contexts remaining to be executed in the present context interval, the method proceeds (process block 606), or otherwise proceeds as shown (process block 604).

In the illustrated embodiment, (process block 606) all the selected jobs are assigned to logical processor contexts, and the method then proceeds (process block 607) at which n, the number of logical processor contexts remaining to be executed in the present context interval, is reduced by the number of selected jobs. The method then proceeds (process block 608) at which i is incremented by 1, before proceeding (process block 609) at which it is determined whether the number of logical processor contexts remaining to be executed in the present context interval is greater than zero, that is, that logical processor contexts remain to be attributed. If it is determined that the number of logical processor contexts remaining to be executed in the present context interval is greater than zero, the method returns (process block 602), or otherwise terminates (process block 610). If it is determined (process block 603) that the number of selected jobs is not less than the number of logical processor contexts remaining to be executed in the present context interval, the method proceeds (process block 604) where the selected jobs are passed to secondary schedule table 450, these jobs then being sorted (process block 605) based on their secondary schedule table priority. The method then proceeds (process block 606), at which the top n jobs from secondary schedule table 450 are scheduled to fill all of the remaining logical processor contexts. The method accordingly sets n to zero (process block 607) before reverting (process block 608) as described above.

Figure 7:
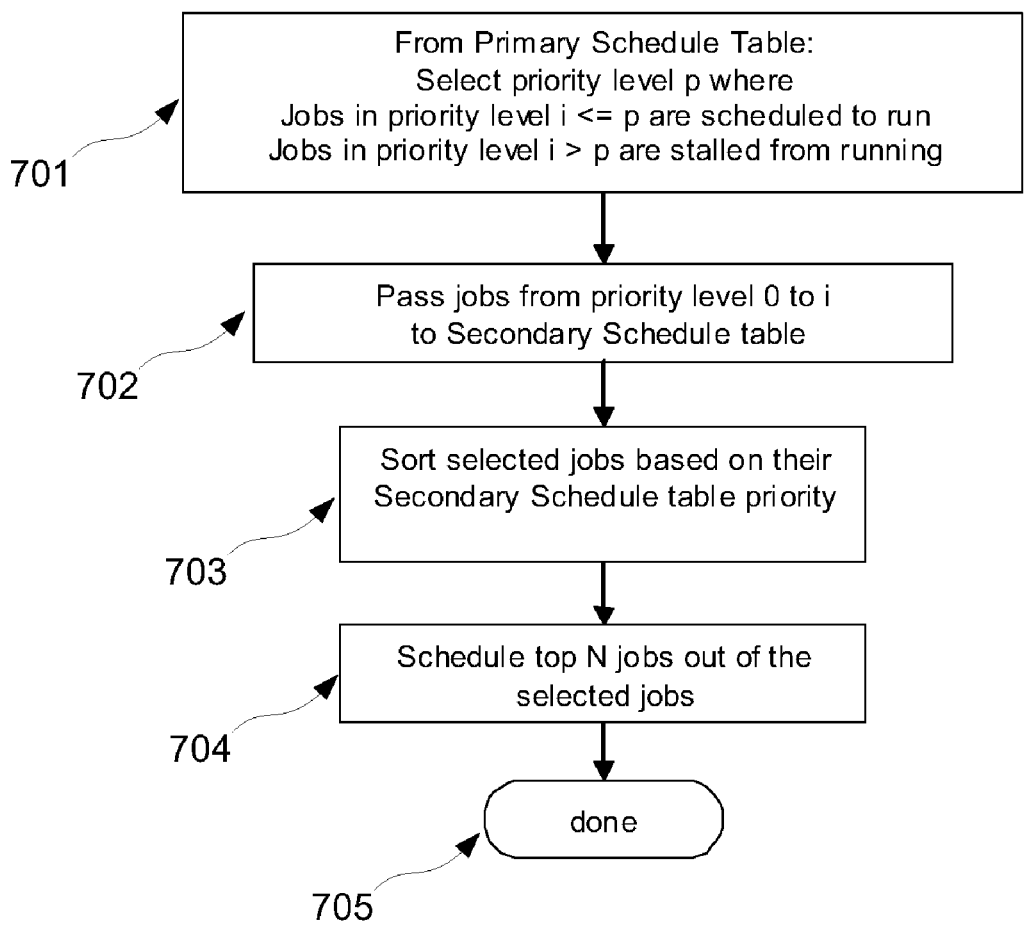
FIG. 7 shows a flowchart for a Stall priority selection mechanism according to an embodiment of the present invention.

In FIG. 7 the flowchart for a second job selection mechanism, known as Stall priority, is shown. In this method embodiment a Primary Schedule Table is used to filter stalled jobs/threads from jobs which are not stalled. Only jobs not stalled are passed to the Secondary Schedule to be sorted then scheduled to run on the logical processors.

Thus according to this embodiment, whichever selecting algorithm is used solely to select jobs that are not currently stalled, the other selecting algorithm is used to complete attributing each of the first predetermined number (N) of concurrent scheduling time quanta to the non-stalled jobs.

As shown in FIG. 7, the method starts (process block 701), at which point the priority threshold is determined, such that any jobs having a priority level less than or equal to this threshold are potentially attributed to logical processor contexts, and any jobs having a priority level greater than this threshold are considered to be stalled, and not eligible for attribution to logical processor contexts. The method then proceeds (process block 702) at which point jobs that are not stalled are loaded into secondary schedule table 450. The secondary schedule table sorts these threads as described above (process block 703), whereupon the top N jobs/threads are scheduled (process block 704).

According to a further embodiment Logical Processors/hardware contexts are assigned to different jobs/threads in a multithreaded/multicore environment. There are provided a number of different sorting algorithms, from which one is periodically selected on the basis of whether the present algorithm is giving satisfactory results or not. The period is preferably a super-context interval. The different sorting algorithms preferably include a software/OS priority. A second sorting algorithm may include sorting according to hardware performance measurements. The judgement of satisfactory performance is preferably based on the difference between a desired number of time quantum attributed per super-context switch interval to each job/thread and a real number of time quantum attributed per super-context switch interval to each job/thread.

Embodiments of the present invention can take the form of an entirely hardware embodiment, an entirely software embodiment or an embodiment containing both hardware and software elements. In particular it will be appreciated that while FIG. 4 is presented in the form of hardware, exactly equivalent effects could be achieved in software. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method of scheduling logical processor contexts to (P) different jobs in a multithreaded/multicore environment wherein a first predetermined number (N) of logical processor contexts may be carried out in a given context switch interval, said method comprising:

determining a software/OS priority for each of said different jobs;

defining super-context switch intervals of equal length, each of said super-context switch intervals divided into a predetermined number of context switch intervals of equal length;

attributing a desired number of concurrent scheduling time quanta to each of said different jobs utilizing said software/OS priority and each of the super-context switch intervals;

attributing each of said first predetermined number (N) of logical processor contexts for each context switch interval to a respective one of said different jobs utilizing one of a first sorting algorithm and a second sorting algorithm, wherein said first sorting algorithm comprises an algorithm to sort said different jobs according to software/OS priorities, and wherein utilization of said first sorting algorithm is a default mode of operation;

determining an error value based on a difference between said desired number of concurrent scheduling time quanta per super-context switch interval and an average number of concurrent scheduling time quanta attributed per super-context switch interval to each of said different jobs, wherein said determining the error value comprises,
   determining the average number of concurrent scheduling time quanta attributed per super-context switch interval to each of said different jobs;
   determining for each job of said different jobs a difference value between said desired number of concurrent scheduling time quantum per super-context switch interval and said average number of concurrent scheduling time quanta attributed per super-context switch interval to each of said different jobs; and
   combining the difference values for all jobs to arrive at said error value;
determining that the error value exceeds a predefined threshold for the error value; and
switching to a sorting algorithm of said first sorting algorithm and said second sorting algorithm other than a presently selected sorting algorithm of said first sorting algorithm and said second sorting algorithm for a subsequent super-context switch interval in response to said determining that the error value exceeds a predefined threshold for the error value.

2. The method of claim 1 wherein a length of the super context interval is equal to a positive integer multiple of an estimated duration of a longest job of said different jobs.

3. The method of claim 1 wherein said second sorting algorithm comprises an algorithm to sort said different jobs according to hardware performance counters.

4. The method of claim 3 wherein in response to a determination that two of said different jobs are assigned equal priority utilizing one of said first sorting algorithm and said second sorting algorithm, another of said first sorting algorithm and said second sorting algorithm is utilized to prioritize said two of said different jobs.

5. The method of claim 3 wherein one of said first sorting algorithm and said second sorting algorithm are utilized solely to select jobs of said different jobs that are not currently stalled, and another of said first sorting algorithm and said second sorting algorithm is utilized complete said attributing a desired number of concurrent scheduling time quanta to each of said different jobs.

6. The method of claim 3 wherein there is defined a warm up period during which a selected sorting algorithm remains said first sorting algorithm regardless of said error value.

7. A computer program product comprising computer-executable instructions which when executed cause a computer to perform a method of scheduling logical processor contexts to (P) different jobs in a multithreaded/multicore environment wherein a first predetermined number (N) of logical processor contexts may be carried out in a given context switch interval, said method comprising:
   determining a software/OS priority for each of said different jobs;
   defining super-context switch intervals of equal length, each of said super-context switch intervals divided into a predetermined number of context switch intervals of equal length;
   attributing a desired number of concurrent scheduling time quanta to each of said different jobs utilizing said software/OS priority and each of the super-context switch intervals;
   attributing each of said first predetermined number (N) of logical processor contexts for each context switch interval to a respective one of said different jobs utilizing at least one of a first sorting algorithm and a second sorting algorithm, wherein said first sorting algorithm comprises an algorithm to sort said different jobs according to software/OS priorities, and wherein utilization of said first sorting algorithm is a default mode of operation;
   determining an error value based on a difference between said desired number of concurrent scheduling time quanta per super-context switch interval and an average number of concurrent scheduling time quanta attributed per super-context switch interval to each of said different jobs, wherein said determining the error value comprises,
      determining the average number of concurrent scheduling time quanta attributed per super-context switch interval to each of said different jobs;
      determining for each job of said different jobs a difference value between said desired number of concurrent scheduling time quantum per super-context switch interval and said average number of concurrent scheduling time quanta attributed per super-context switch interval to each of said different jobs; and
      combining the difference values for all jobs to arrive at said error value;
   determining that the error value exceeds a predefined threshold for the error value; and
   switching to a sorting algorithm of said first sorting algorithm and said second sorting algorithm other than a presently selected sorting algorithm of said first sorting algorithm and said second sorting algorithm for a subsequent super-context switch interval in response to said determining that the error value exceeds a predefined threshold for the error value.

8. A data processing system adapted to schedule logical processor contexts to (P) different jobs in a multithreaded/multicore environment wherein a first predetermined number (N) of logical processor contexts may be carried out in a given context switch interval, comprising:
   means for determining a software/OS priority for each of said different jobs;
   means for defining super-context switch intervals of equal length, each of said super-context switch intervals divided into a predetermined number of context switch intervals of equal length;
   means for attributing a desired number of concurrent scheduling time quanta to each of said different jobs utilizing said software/OS priority and each of the super-context switch intervals;
   means for attributing each of said first predetermined number (N) of logical processor contexts for each context switch interval to a respective one of said different jobs utilizing at least one of a first sorting algorithm and a second sorting algorithm, wherein said first sorting algorithm comprises an algorithm to sort said different jobs according to software/OS priorities, and wherein utilization of said first sorting algorithm is a default mode of operation;
   means for determining an error value based on a difference between said desired number of concurrent scheduling time quanta per super-context switch interval and a number of concurrent scheduling time quanta attributed per super-context switch interval to each of said different jobs, wherein said determining the error value comprises,
      determining the average number of concurrent scheduling time quanta attributed per super-context switch interval to each of said different jobs;
      determining for each job of said different jobs a difference value between said desired number of concurrent scheduling time quantum per super-context switch interval and said average number of concurrent scheduling time quanta attributed per super-context switch interval to each of said different jobs; and
      combining the difference values for all jobs to arrive at said error value;

determining that the error value exceeds a predefined threshold for the error value; and means for switching to a sorting algorithm of said first sorting algorithm and said second sorting algorithm other than a presently selected sorting algorithm of said first sorting algorithm and said second sorting algorithm for a subsequent super-context switch interval in response to said determining that the error value exceeds a predefined threshold for the error value.

\* \* \* \* \*